(12) United States Patent
Zhou et al.

(10) Patent No.: US 11,310,412 B2
(45) Date of Patent: Apr. 19, 2022

(54) AUTOFOCUSING CAMERA AND SYSTEMS

(71) Applicant: SZ DJI TECHNOLOGY CO., LTD., Shenzhen (CN)

(72) Inventors: You Zhou, Shenzhen (CN); Jiaqi Yan, Shenzhen (CN); Wen Xu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/869,384

(22) Filed: May 7, 2020

(65) Prior Publication Data
US 2020/0267323 A1     Aug. 20, 2020

Related U.S. Application Data

(63) Continuation of application No. PCT/CN2018/107749, filed on Sep. 26, 2018.

(51) Int. Cl.
*H04N 5/232*     (2006.01)
*H04N 7/18*     (2006.01)
(Continued)

(52) U.S. Cl.
CPC ... *H04N 5/232127* (2018.08); *H04N 5/23299* (2018.08); *H04N 5/232121* (2018.08)

(58) Field of Classification Search
CPC ......... H04N 5/232127; H04N 5/23299; H04N 5/23212; H04N 7/185; G02B 7/285; G01S 3/7864; G01S 15/08; G01S 17/00; G01S 17/08; G08B 13/19608; G03B 13/20; G03B 13/36; G03B 15/006; B64C 2201/127; B64C 2201/027; B64C 2201/00; B64C 2201/20; G06T 2207/10032

USPC ...... 348/214, 169, 142–160, 139, 47, 218.1, 348/333.01, 333.09, 345, 326, 341, 745; 396/80, 104, 204; 235/411, 413, 414, 235/462.23
See application file for complete search history.

(56) References Cited

U.S. PATENT DOCUMENTS

| | | |
|---|---|---|
| 5,187,516 A | 2/1993 | Suzuki |
| 5,634,151 A | 5/1997 | Kim |

(Continued)

FOREIGN PATENT DOCUMENTS

| | | |
|---|---|---|
| CN | 1152724 A | 6/1997 |
| CN | 103024259 A | 4/2013 |

(Continued)

OTHER PUBLICATIONS

International Search Report and Written Opinion issued by the International Searching Authority in related PCT Application No. PCT/CN2018/107749, dated May 29, 2019 (10 pgs.).

*Primary Examiner* — Marly S Camargo
(74) *Attorney, Agent, or Firm* — Finnegan, Henderson, Farabow, Garrett & Dunner, LLP

(57) ABSTRACT

Apparatuses and methods for focusing a camera are disclosed. For example, an apparatus may be coupled to a camera for focusing the camera. The apparatus includes a vision sensor coupled to a processor and configured to capture a view. The processor configured to receive a selection of an area of interest in the view. The apparatus further includes a distance measurement unit coupled to the processor and configured to measure a distance to the area of interest for adjusting the camera's focus.

19 Claims, 7 Drawing Sheets

(51) Int. Cl.

| | | |
|---|---|---|
| *G01S 3/786* | (2006.01) | |
| *G01S 17/00* | (2020.01) | |
| *G01S 17/08* | (2006.01) | |
| *G01S 15/08* | (2006.01) | |
| *G02B 7/28* | (2021.01) | |
| *G03B 13/20* | (2021.01) | |
| *G03B 13/26* | (2021.01) | |
| *G03B 15/00* | (2021.01) | |

(56) References Cited

U.S. PATENT DOCUMENTS

| | | | |
|---|---|---|---|
| 6,327,437 B1 | 12/2001 | Desormeaux | |
| 2016/0295097 A1* | 10/2016 | Shanmugavadivelu | ..................... H04N 5/23212 |
| 2017/0180729 A1* | 6/2017 | Wu | ...................... H04N 19/115 |
| 2017/0195549 A1* | 7/2017 | Cao | ................... H04N 5/23212 |
| 2017/0219693 A1* | 8/2017 | Choiniere | ................ G01S 7/484 |
| 2018/0025498 A1* | 1/2018 | Omari | ...................... G06T 7/246 |
| 2019/0050664 A1* | 2/2019 | Yang | ...................... G06K 9/3222 |
| 2021/0014427 A1* | 1/2021 | Honjo | ................ H04N 5/23299 |

FOREIGN PATENT DOCUMENTS

| | | | |
|---|---|---|---|
| CN | 106657794 A | 5/2017 | |
| CN | 206650793 U | 11/2017 | |
| CN | 107431745 A | 12/2017 | |
| CN | 108141522 A | 6/2018 | |
| CN | 108351574 A | 7/2018 | |
| CN | 108513631 A | 9/2018 | |

\* cited by examiner

AUTOFOCUSING CAMERA AND SYSTEMS

CROSS-REFERENCE TO RELATED APPLICATIONS

This application is a continuation of International Application No. PCT/CN2018/107749, filed Sep. 26, 2018, now pending, which is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to cameras and systems with fast autofocusing and automatic focus tracking capabilities.

BACKGROUND

Cameras find use in many environments including, for example, surveillance systems, sports, unmanned aerial vehicles (UAV), etc. Whether to take a sharp image or an intentionally blurry image, one must adjust the camera to the correct focus. Most cameras today include a number of lenses or lens groups that can move with respect to one another, thereby providing for automatic focusing.

Several common autofocusing techniques exist. For example, a camera may include a device for measuring the distance to an object and automatically focusing on the object based on the measured distance. The distance measurement device may include an infrared light or laser emitter and a light sensor that senses the infrared light or laser. The time of flight (TOF), i.e., from the time the light is emitted from the emitter to the time the sensor senses the light, reflects the distance between the device and the object. Some distance measurement devices may also utilize ultrasound instead of light. With the measured distance, a controller (such as a computer) in the camera can send signals to motors that drive and move the lenses to achieve focus.

Some cameras employ a phase detection method to adjust focus. A mirror reflects the image of the object onto two phase sensors, and a computer compares the two reflected images sensed by the sensors. Focus occurs when the two reflected images are identical.

Another way of autofocusing, known as contrast detection, involves detection of contrast and finding the position of the lenses that provides the best contrast. As the lenses or lens groups move, thereby changing focus, the camera takes images of an object, and the computer associated with the camera analyzes the images and compares contrasts between consecutive images. Increase in the contrast between consecutive images suggests the lenses are moving in the correct direction for improving focus, and the position of the lenses that generates the image with the highest contrast provides the best focus.

Each method has advantages and disadvantages. Contrast detection requires analysis of many images as the lenses move back and forth and is therefore slow. Distance measurement and phase detection methods both take much less time. But the distance measurement method can only determine the distance from the camera to the closest object in the view and fails when one wants to take a picture with a focus on an object further in the view. The phase detection method can achieve focus with precision rather quickly, but requires complex and expensive construction of the camera, because the camera must include multiple autofocus sensors which each include its own lens and photodetector. In addition, the number of autofocus sensors limits the number of areas to focus on in the view. Two autofocus sensors, for example, means the camera can only focus on one part of the image. Raising the number of focus points would further raise the price of the camera.

Many cameras combine these autofocusing methods. A typical combination includes the distance measurement method or phase detection method as a first step to quickly get the camera in the ballpark of focus, followed with contrast detection to fine tune the focus.

These autofocusing methods work well when taking static pictures, but not so well in moving environments, where objects at different distances move with time. Especially when shooting a video, the camera must adjust and track its focus in real-time with objects moving. Manual focusing remains necessary in such situations.

Accordingly, there exists a need for fast, precise, and inexpensive autofocusing and focus tracking technology adapted for various environments.

SUMMARY

Consistent with embodiments of the present disclosure, an apparatus is provided for focusing a camera. The apparatus includes a vision sensor coupled to a processor and configured to capture a view. The processor configured to receive a selection of an area of interest in the view. The apparatus further includes a distance measurement unit coupled to the processor and configured to measure a distance to the area of interest for adjusting the camera's focus.

There is also provided a method for focusing a camera. First, a vision sensor captures a view. Then, an area of interest in the captured view is selected. A distance measurement unit measures the distance of the area of interest from itself. And the camera's focus is adjusted based on the measured distance.

There is further provided a movable object that includes a camera, an auxiliary focusing device including a vision sensor and a distance measurement unit, and a processor. The processor is configured to cause the vision sensor to capture a view, receive a selection of an area of interest, cause the distance measurement unit to measure a distance to the area of interest, and cause adjustment of the camera's focus based on the measured distance.

It is to be understood that both the foregoing general description and the following detailed description are exemplary and explanatory only and are not restrictive of the invention, as claimed.

DETAILED DESCRIPTION

Figure 1:
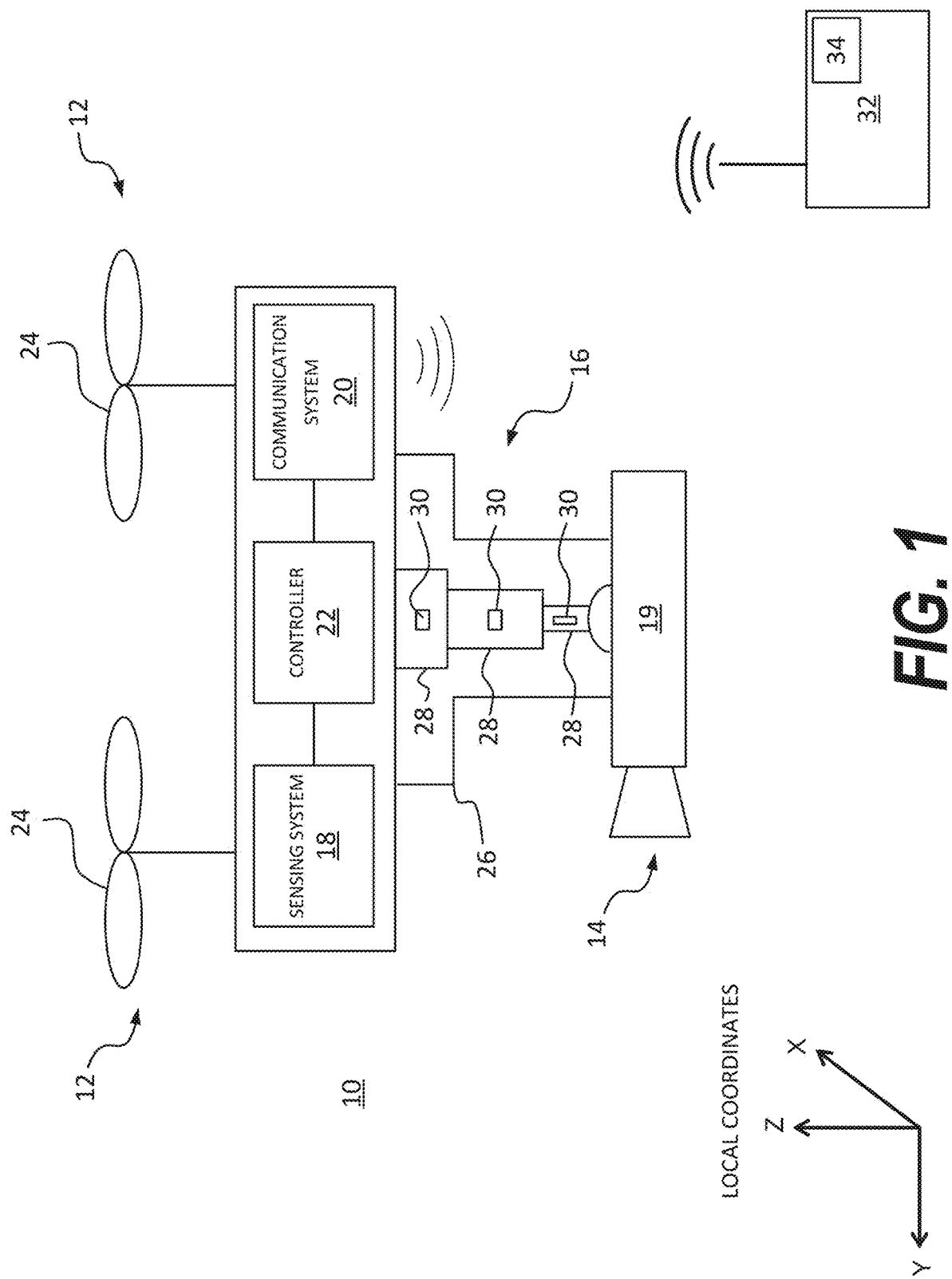
FIG. 1 shows an exemplary movable object configured in accordance with embodiments of the present disclosure.

The following detailed description refers to the accompanying drawings. Wherever possible, the same reference numbers refer to the same or similar parts. While several illustrative embodiments are described herein, modifications, adaptations and other implementations are possible. For example, substitutions, additions or modifications may be made to the components illustrated in the drawings. Accordingly, the following detailed description is not limited to the disclosed embodiments and examples. Instead, the proper scope is defined by the appended claims.

Consistent with embodiments of the present disclosure, there are provided cameras or camera systems that can quickly and automatically focus on one or more objects or areas for taking a picture or shooting a video. In addition to taking static images, these cameras may be used in sports, surveillance systems, Unmanned Aerial Vehicles (UAVs), etc., where one or more of the objects and the cameras may move. The cameras may be mounted on other devices, such as cars, UAVs, bikes, helmets, etc., or on a person, or mounted on a handheld device to be held in hand.

As an example, FIG. 1 shows a movable object 10 that may be configured to move or travel within an environment. Movable object 10 may be a UAV or any other suitable object, device, mechanism, system, or machine configured to travel on or within a suitable medium (e.g., a surface, air, water, rails, space, underground, etc.). Movable object 10 may also be other types of movable object (e.g., wheeled objects, nautical objects, locomotive objects, other aerial objects, etc.). As used herein, the term UAV refers to an aerial device configured to be operated and/or controlled automatically (e.g., via an electronic control system) and/or manually by off-board personnel.

Movable object 10 includes one or more propulsion devices 12 and may be configured to carry a payload 14. Payload 14 may be connected or attached to movable object 10 by a carrier 16, which may allow for one or more degrees of relative movement between payload 14 and movable object 10. Payload 14 may also be mounted directly to movable object 10 without carrier 16. Movable object 10 also includes a sensing system 18, a communication system 20, and a controller 22 in communication with the other components.

Movable object 10 may include one or more (e.g., 1, 2, 3, 3, 4, 5, 10, 15, 20, etc.) propulsion devices 12 positioned at various locations (for example, top, sides, front, rear, and/or bottom of movable object 10) for propelling and steering movable object 10. Propulsion devices 12 are devices or systems operable to generate forces for sustaining controlled flight. Propulsion devices 12 may share or may each separately include or be operatively connected to a power source, such as a motor (e.g., an electric motor, hydraulic motor, pneumatic motor, etc.), an engine (e.g., an internal combustion engine, a turbine engine, etc.), a battery bank, etc., or a combination thereof. Each propulsion device 12 may also include one or more rotary components 24 drivably connected to the power source and configured to participate in the generation of forces for sustaining controlled flight. For instance, rotary components 24 may include rotors, propellers, blades, nozzles, etc., which may be driven on or by a shaft, axle, wheel, hydraulic system, pneumatic system, or other component or system configured to transfer power from the power source. Propulsion devices 12 and/or rotary components 24 may be adjustable (e.g., tiltable) with respect to each other and/or with respect to movable object 10. Alternatively, propulsion devices 12 and rotary components 24 may have a fixed orientation with respect to each other and/or movable object 10. In some embodiments, each propulsion device 12 may be of the same type. In other embodiments, propulsion devices 12 may be of multiple different types. In some embodiments, all propulsion devices 12 may be controlled in concert (e.g., all at the same speed and/or angle). In other embodiments, one or more propulsion devices may be independently controlled with respect to, e.g., speed and/or angle.

Propulsion devices 12 may be configured to propel movable object 10 in one or more vertical and horizontal directions and to allow movable object 10 to rotate about one or more axes. That is, propulsion devices 12 may be configured to provide lift and/or thrust for creating and maintaining translational and rotational movements of movable object 10. For instance, propulsion devices 12 may be configured to enable movable object 10 to achieve and maintain desired altitudes, provide thrust for movement in all directions, and provide for steering of movable object 10. In some embodiments, propulsion devices 12 may enable movable object 10 to perform vertical takeoffs and landings (i.e., takeoff and landing without horizontal thrust). In other embodiments, movable object 10 may require constant minimum horizontal thrust to achieve and sustain flight. Propulsion devices 12 may be configured to enable movement of movable object 10 along and/or about multiple axes.

Payload 14 includes a sensory device 19. Sensory device 19 may include devices for collecting or generating data or information, such as surveying, tracking, and capturing images or video of targets (e.g., objects, landscapes, subjects of photo or video shoots, etc.). Sensory device 19 may include imaging devices configured to gather data that may be used to generate images. The imaging devices may include photographic cameras, video cameras, infrared imaging devices, ultraviolet imaging devices, x-ray devices, ultrasonic imaging devices, radar devices, etc. Sensory device 19 may also or alternatively include devices for capturing audio data, such as microphones or ultrasound detectors. Sensory device 19 may also or alternatively include other suitable sensors for capturing visual, audio, and/or electromagnetic signals.

Carrier 16 may include one or more devices configured to hold payload 14 and/or allow payload 14 to be adjusted (e.g., rotated) with respect to movable object 10. For example, carrier 16 may be a gimbal. Carrier 16 may be configured to allow payload 14 to be rotated about one or more axes, as described below. In some embodiments, carrier 16 may be configured to allow payload 14 to rotate about each axis by 360° to allow for greater control of the perspective of payload 14. In other embodiments, carrier 16 may limit the range of rotation of payload 14 to less than 360° (e.g., ≤270°, ≤210°, ≤180°, ≤120°, ≤90°, ≤45°, ≤30°, ≤15°, etc.) about one or more of its axes.

Carrier 16 may include a frame assembly 26, one or more actuator members 28, and one or more carrier sensors 30. Frame assembly 26 may be configured to couple payload 14 to movable object 10 and, in some embodiments, to allow payload 14 to move with respect to movable object 10. In some embodiments, frame assembly 26 may include one or more sub-frames or components movable with respect to each other. Actuator members 28 are configured to drive components of frame assembly 26 relative to each other to provide translational and/or rotational motion of payload 14 with respect to movable object 10. In other embodiments, actuator members 28 may be configured to directly act on payload 14 to cause motion of payload 14 with respect to frame assembly 26 and movable object 10. Actuator members 28 may be or may include suitable actuators and/or force transmission components. For example, actuator members 28 may include electric motors configured to provide linear and/or rotational motion to components of frame assembly 26 and/or payload 14 in conjunction with axles, shafts, rails, belts, chains, gears, and/or other components.

Carrier sensors 30 may include devices configured to measure, sense, detect, or determine state information of carrier 16 and/or payload 14. State information may include positional information (e.g., relative location, orientation, attitude, linear displacement, angular displacement, etc.), velocity information (e.g., linear velocity, angular velocity, etc.), acceleration information (e.g., linear acceleration, angular acceleration, etc.), and or other information relating to movement control of carrier 16 or payload 14, either independently or with respect to movable object 10. Carrier sensors 30 may include one or more types of suitable sensors, such as potentiometers, optical sensors, visions sensors, magnetic sensors, motion or rotation sensors (e.g., gyroscopes, accelerometers, inertial sensors, etc.). Carrier sensors 30 may be associated with or attached to various components of carrier 16, such as components of frame assembly 26 or actuator members 28, or to movable object 10. Carrier sensors 30 may be configured to communicate data and information with controller 22 via a wired or wireless connection (e.g., RFID, Bluetooth, Wi-Fi, radio, cellular, etc.). Data and information generated by carrier sensors 30 and communicated to controller 22 may be used by controller 22 for further processing, such as for determining state information of movable object 10 and/or targets.

Carrier 16 may be coupled to movable object 10 via one or more damping elements configured to reduce or eliminate undesired shock or other force transmissions to payload 14 from movable object 10. Damping elements may be active, passive, or hybrid (i.e., having active and passive characteristics). Damping elements may be formed of any suitable material or combinations of materials, including solids, liquids, and gases. Compressible or deformable materials, such as rubber, springs, gels, foams, and/or other materials may be used as damping elements. The damping elements may function to isolate payload 14 from movable object 10 and/or dissipate force propagations from movable object 10 to payload 14. Damping elements may also include mechanisms or devices configured to provide damping effects, such as pistons, springs, hydraulics, pneumatics, dashpots, shock absorbers, and/or other devices or combinations thereof.

Sensing system 18 may include one or more sensors associated with one or more components or other systems of movable device 10. For instance, sensing system 18 may include sensors for determining positional information, velocity information, and acceleration information relating to movable object 10 and/or targets. In some embodiments, sensing system 18 may also include carrier sensors 30. Components of sensing system 18 may be configured to generate data and information that may be used (e.g., processed by controller 22 or another device) to determine additional information about movable object 10, its components, and/or its targets. Sensing system 18 may include one or more sensors for sensing one or more aspects of movement of movable object 10. For example, sensing system 18 may include sensory devices associated with payload 14 as discussed above and/or additional sensory devices, such as a positioning sensor for a positioning system (e.g., GPS, GLONASS, Galileo, Beidou, GAGAN, RTK, etc.), motion sensors, inertial sensors (e.g., IMU sensors, MIMU sensors, etc.), proximity sensors, image sensors, etc. Sensing system 18 may also include sensors configured to provide data or information relating to the surrounding environment, such as weather information (e.g., temperature, pressure, humidity, etc.), lighting conditions (e.g., light-source frequencies), air constituents, or nearby obstacles (e.g., objects, structures, people, other vehicles, etc.).

Communication system 20 may be configured to enable communication of data, information, commands, and/or other types of signals between controller 22 and off-board entities, such as terminal 32, a smartphone, or another suitable entity. Communication system 20 may include one or more components configured to send and/or receive signals, such as receivers, transmitter, or transceivers, that are configured for one-way or two-way communication. Components of communication system 20 may be configured to communicate with off-board entities via one or more communication networks, such as radio, cellular, Bluetooth, Wi-Fi, RFID, and/or other types of communication networks usable to transmit signals indicative of data, information, commands, and/or other signals. For example, communication system 20 may be configured to enable communication between devices for providing input for controlling movable object 10 during flight, such as a control terminal ("terminal") 32.

Controller 22 may be configured to communicate with various devices onboard movable object 10, such as communication system 20 and sensing system 18. Controller 22 may also communicate with a positioning system (e.g., a global navigation satellite system, or GNSS) (not pictured) to receive data indicating the location of movable object 10. Controller 22 may communicate with various other types of devices, including a barometer, an inertial measurement unit (IMU), a transponder, or the like, to obtain positioning information and velocity information of movable object 10. Controller 22 may also provide control signals (e.g., in the form of pulsing or pulse width modulation signals) to one or more electronic speed controllers (ESCs) (not pictured), which may be configured to control one or more of propulsion devices 12. Controller 22 may thus control the movement of movable object 10 by controlling one or more electronic speed controllers.

Terminal 32 may be configured to receive input, such as input from a user (i.e., user input), and communicate signals indicative of the input to controller 22. Terminal 32 may be configured to receive input and generate corresponding signals indicative of one or more types of information, such as control data (e.g., signals) for moving or manipulating movable device 10 (e.g., via propulsion devices 12), payload 14, and/or carrier 16. Terminal 32 may also be configured to receive data and information from movable object 10, such as data collected by or associated with payload 14 and operational data relating to, for example, positional data, velocity data, acceleration data, sensory data, and other data and information relating to movable object 10, its components, and/or its surrounding environment. Terminal 32 may be a remote control with physical sticks, levers, switches, and/or buttons configured to control flight parameters, or may be or include a touch screen device, such as a smartphone or a tablet, with virtual controls for the same purposes, and may employ an application on a smartphone or a tablet, or a combination thereof.

In some embodiments, terminal 32 may include a smart eyeglass. As used herein, a smart eyeglass may include any wearable computer glasses or other wearable item that can provide additional information to an image or scene that a wearer sees. A smart eyeglass may include an optical head-mounted display (OHMD) or embedded wireless glasses with transparent heads-up display (HUD) or augmented reality (AR) overlay that has the capability of reflecting projected digital images as well as allowing the user to see through it or see better with it. The smart eyeglass may serve as a front-end display for images, videos, and other data or information received from the movable object 10, for example, via cellular technology or Wi-Fi. In some embodiments, the smart eyeglass may also control the movable object 10 via natural language voice commands and/or use of touch buttons on the smart eyeglass.

Figure 2B:
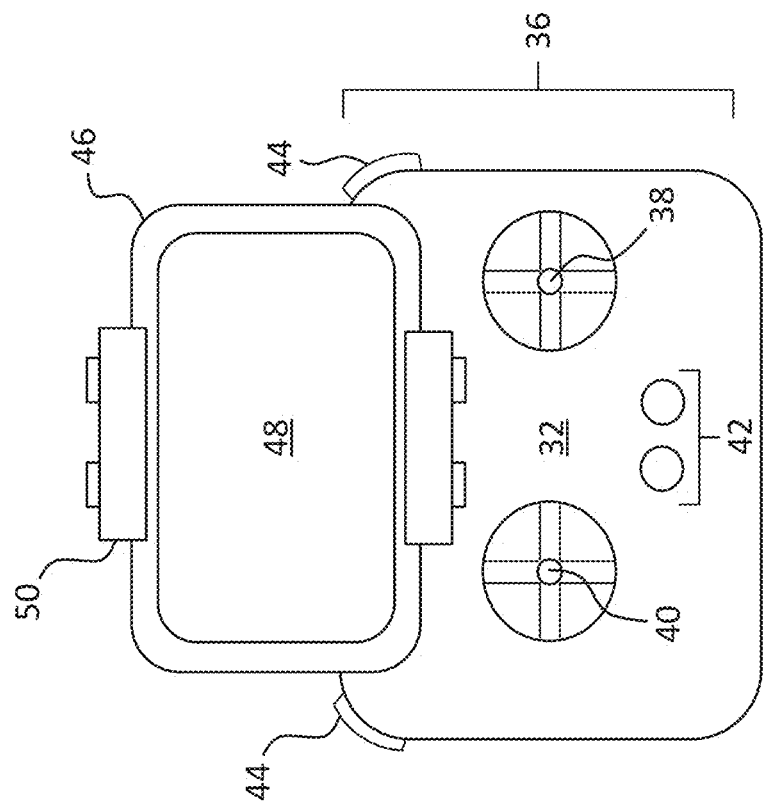
FIG. 2B shows another exemplary terminal configured in accordance with embodiments of the present disclosure.
Figure 2A:
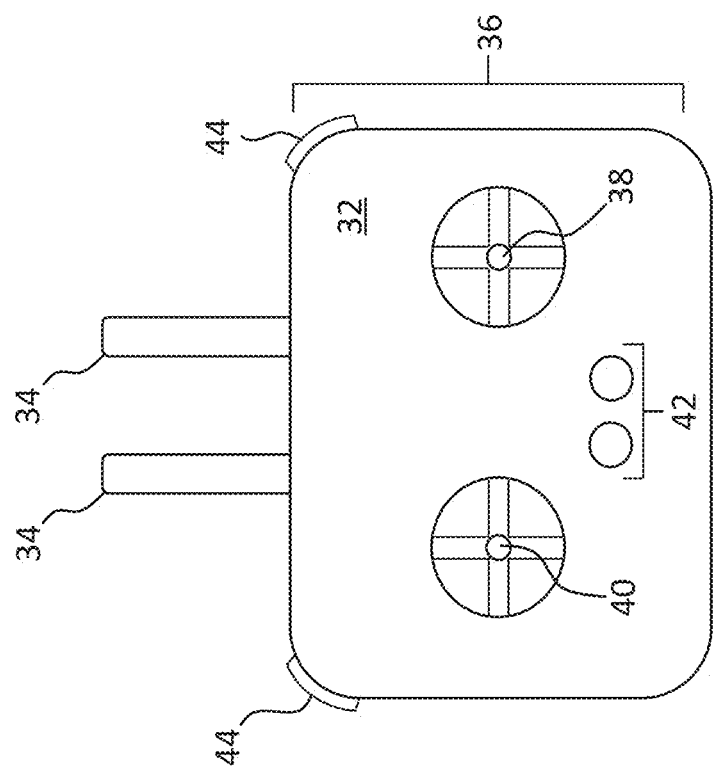
FIG. 2A shows an exemplary terminal configured in accordance with embodiments of the present disclosure.

In the example shown in FIGS. 2A and 2B, terminal 32 may include communication devices 34 that facilitate communication of information between terminal 32 and other entities, such as movable object 10 or another terminal 32. Communication devices 34 may include antennas or other devices configured to send and/or receive signals. Terminal 32 may also include one or more input devices 36 configured to receive input from a user for communication to movable object 10. FIG. 2A shows one exemplary embodiment of terminal 32 having an input device 36 with a plurality of input devices, such as levers 38 and 40, buttons 42, and triggers 44 for receiving one or more inputs from the user. Each input device of terminal 32 may be configured to generate an input signal communicable to controller 22 and usable by controller 22 as inputs for processing. In addition to flight control inputs, terminal 32 may be used to receive user inputs of other information, such as manual control settings, automated control settings, control assistance settings etc., which may be received, for example, via buttons 42 and/or triggers 44. It is understood that terminal 32 may include other or additional input devices, such as buttons, switches, dials, levers, triggers, touch pads, touch screens, soft keys, a mouse, a keyboard, a voice recognition device, and/or other types of input devices. It is understood that different combinations or layouts of input devices for a terminal such as terminal 32 are possible and within the scope of this disclosure.

As shown in the alternative embodiment of FIG. 2B, terminal 32 may also include a display device 46 configured to display information to and/or receive information from a user. For example, terminal 32 may be configured to receive signals from movable object 10, which signals may be indicative of information or data relating to movements of movable object 10 and/or data (e.g., imaging data) captured by movable object 10 (e.g., in conjunction with payload 14). In some embodiments, display device 46 may be a multifunctional display device configured to display information on a multifunctional screen 48 as well as receive user input via the multifunctional screen 48. For example, in one embodiment, display device 46 may be configured to receive one or more user inputs via multifunctional screen 48. In another embodiment, multifunctional screen 48 may constitute a sole input device for receiving user input.

In some embodiments, terminal 32 may be or include an interactive graphical interface for receiving one or more user inputs. That is, terminal 32 may provide a graphical user interface (GUI) and/or include one or more graphical versions of input devices 36 for receiving user input. Graphical versions of terminal 32 and/or input devices 36 may be displayable on a display device (e.g., display device 46) or a multifunctional screen (e.g., multifunctional screen 48) and may include graphical features, such as interactive graphical features (e.g., graphical buttons, text boxes, drop-down menus, interactive images, etc.). For example, in some embodiments, terminal 32 may include graphical representations of input levers 38 and 40, buttons 42, and triggers 44, which may be displayed on and configured to receive user input via multifunctional screen 48. In some embodiments, terminal 32 may be configured to receive all user inputs via graphical input devices, such as graphical versions of input devices 36. Terminal 32 may be configured to generate graphical versions of input devices 36 in conjunction with a computer application (e.g., an "app") to provide an interactive interface on the display device or multifunctional screen of any suitable electronic device (e.g., a cellular phone, a tablet, etc.) for receiving user inputs.

In some embodiments, the display device (e.g., 46) may display an image received from movable object 10 and include interactive means for the user to identify or select a portion of the image of interest to the user. For example, display device 46 may include a touchscreen so that the user can identify or select the portion of interest by touching the corresponding part of the touchscreen.

In some embodiments, display device 46 may be an integral component of terminal 32. That is, display device 46 may be attached or fixed to terminal 32. In other embodiments, display device may be connectable to (and disconnectable from) terminal 32. That is, terminal 32 may be configured to be electronically connectable to display device 46 (e.g., via a connection port or a wireless communication link) and/or otherwise connectable to terminal 32 via a mounting device 50, such as by a clamping, clipping, clasping, hooking, adhering, or other type of mounting device.

In some embodiments, terminal 32 may be configured to communicate with electronic devices configurable for controlling movement and/or other operational aspects of movable object 10. For example, display device 46 may be a display component of an electronic device, such as a cellular phone, a tablet, a personal digital assistant, a laptop computer, or other device. In this way, users may be able to incorporate the functionality of other electronic devices into aspects of controlling movable object 10, which may allow for more flexible and adaptable control schemes. For example, terminal 32 may be configured to communicate with electronic devices having a memory and at least one processor and can be used to provide user input via input devices associated with the electronic device (e.g., a multifunctional display, buttons, stored apps, web-based applications, etc.). Communication between terminal 32 and electronic devices may also be configured to allow for software update packages and/or other information to be received and then communicated to controller 22 (e.g., via communication system 20), shown in FIG. 1.

Although not shown in the figures, the remote control may comprise other forms of control devices, such as a helmet, a goggle, or other devices, that allow user input and communicate the user input to movable object 10 for controlling the movements thereof, as well as display views of vision subsystem 104 (for example, images captured by the on-board camera).

Figure 3:
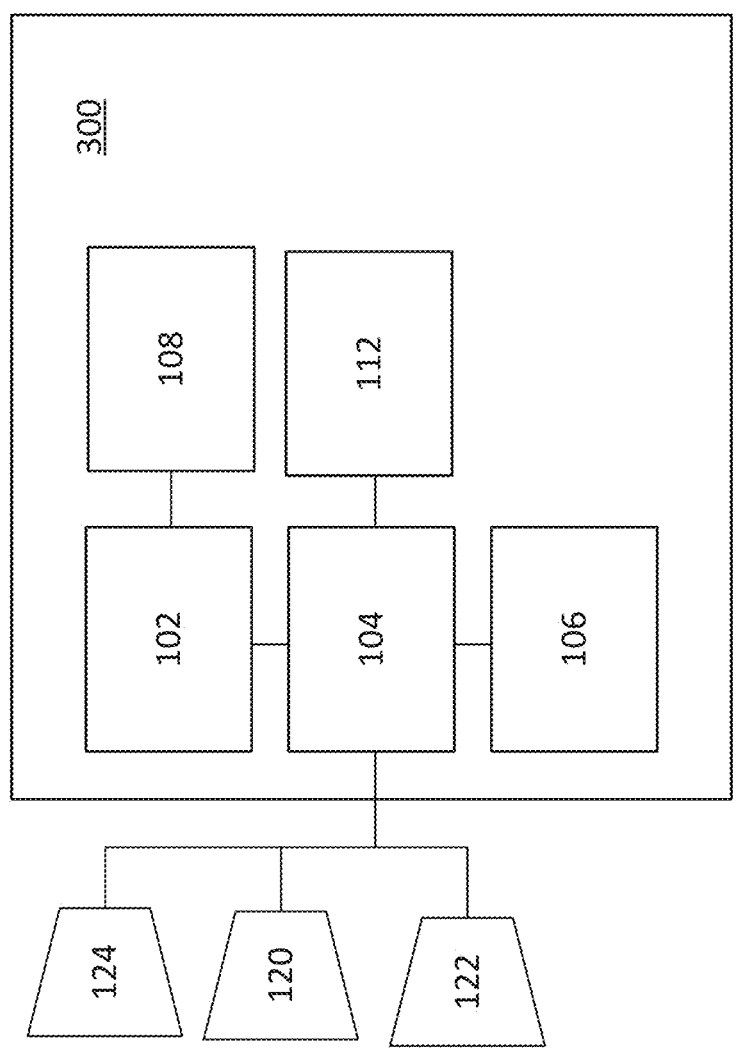
FIG. 3 shows an exemplary system-on-chip controller configured in accordance with embodiments of the present disclosure.

FIG. 3 shows an exemplary controller 22, implemented as system-on-chip (SoC) controller 300, that may include a flight control subsystem 102 coupled to communicate with a vision subsystem 104. Vision subsystem 104 may be configured to detect and visualize (e.g., using computer vision) objects surrounding the UAV. Flight control subsystem 102 may receive information from vision subsystem 104 and utilize the information to determine a flight path or make adjustments to an existing flight path. For example, based on the information received from vision subsystem 104, flight control subsystem 102 may decide whether to stay on an existing flight path, change the flight path to track an object recognized by vision subsystem 104, or change the flight path (e.g., override a command received from an operator) to avoid an obstacle detected by vision subsystem 104.

It is contemplated that vision subsystem 104 may utilize various types of instruments and/or techniques to detect objects surrounding the UAV. For instance, in some embodiments, vision subsystem 104 may communicate with an ultrasonic sensor 120 configured to detect objects surrounding the UAV and measure the distances between the UAV and the detected objects. Vision subsystem 104 may communicate with other types of sensors as well, including time of flight (TOF) sensors 122, radars (e.g., including millimeter wave radars), sonars, lidars, barometers, or the like.

Vision subsystem 104 may be coupled to communicate with an imaging subsystem 106. Imaging subsystem 106 may be configured to obtain images and/or video footage using one or more imaging devices (e.g., cameras) 124. Vision subsystem 104 may utilize the images or video footage to generate a visual representation of the environment surrounding the UAV. It is contemplated that such a visual representation may be utilized for various purposes. In some embodiments, for example, vision subsystem 104 may process the visual representation using one or more image recognition or computer vision processes to detect recognizable objects. Vision subsystem 104 may report objects recognized in this manner to flight control subsystem 102 so that flight control subsystem 102 can determine whether or not to adjust the flight path of the UAV. In another example, vision subsystem 104 may provide (e.g., transmit) the visual representation to a remote operator so that the remote operator may be able to visualize the environment surrounding the UAV as if the operator was situated onboard the UAV. In still another example, the visual representation may be recorded in a data storage device located onboard the UAV.

In some embodiments, flight control subsystem 102, vision subsystem 104, imaging subsystem 106, and imaging device 124 may be configured to operate with reference to a common time signal. In some embodiments, flight control subsystem 102 may be configured to provide a synchronization (SYNC) signal to one or more of vision subsystem 104, imaging subsystem 106, and imaging device 124. Flight control subsystem 102 may use the SYNC signal to control the timing of exposures (or recordings) of imaging device 124, may determine metadata (e.g., location, altitude, heading, temperature, etc.) at the time the SYNC signal was sent, and may timestamp the metadata accordingly. Vision subsystem 104 may then associate the metadata with the captured images or video footage based on the timestamp.

In some embodiments, the images or video footage captured by imaging device 124 may be in a data format which may require further processing. For example, data obtained from an image sensor may need to be converted to a displayable format before a visual representation thereof may be generated. In some embodiments, imaging subsystem 106 may process the captured footage into the right format. Alternatively or additionally, imaging device 124 or vision subsystem 104 may include one or more processors configured to process the captured images or video footage into a suitable format for generation of visual representation.

Vision subsystem 104 may utilize the images or video footage to detect objects surrounding the UAV and report information regarding the detected objects to flight control subsystem 102. Vision subsystem 104 may timestamp the report using the same timestamp originally used for the captured footage. In this manner, flight control subsystem 102 may be able to determine what the environment surrounding the movable object 10 looked like at a given time and adjust the flight path accordingly if needed. Flight control subsystem 102 may also cross-reference location data received from other devices (e.g., positioning system 112) against image data received from vision subsystem 104 based on timestamps for better adjustments of the flight path.

Controller 300 may further include a gimbal control subsystem 108 that controls a gimbal (e.g., carrier 16). Gimbal control subsystem 108 may be in communication with other subsystems (e.g., flight control subsystem 102 and/or imaging subsystem 106). If, for example, imaging subsystem 106 needs to acquire a 360° panoramic view of the environment surrounding movable object 10, gimbal control subsystem 108 may control the gimbal to rotate about a vertical axis at a particular rotational speed. In another example, if flight control subsystem 102 receives a command (e.g., from a user or operator) to acquire images or video footage of a particular location, flight control subsystem 102 may instruct gimbal control subsystem 108 to rotate the gimbal so that an imaging device (e.g., sensory device 19) mounted on the gimbal points toward that particular location. In some embodiments, flight control subsystem 102 may communicate with a positioning system (e.g., GPS, GLONASS, Galileo, Beidou, GAGAN, RTK, etc.) to locate the particular location and may use the location data to control rotation of the gimbal.

In some embodiments, flight control subsystem 102, vision subsystem 104, imaging subsystem 106, and gimbal control subsystem 108 may be packaged together to form blocks (or cores) of single system-on-chip controller 300. Alternatively, these subsystems may be packaged and/or grouped in multiple chips.

Consistent with embodiments of the present disclosure, a movable object may have a main camera with an adjustable focus and an auxiliary focusing module that facilitates the focusing of the main camera. The auxiliary focusing module may adopt one of the faster focusing techniques, such as distance measurement or phase detection, to determine the proper focal length for the main camera. Once the proper focal length is determined, the movable object's controller may control the main camera to adjust its focus accordingly. An auxiliary focusing module separate from the main camera may permit use with existing main cameras without modification, increase speed of autofocusing, and provide great flexibility, as discussed below.

Figure 4:
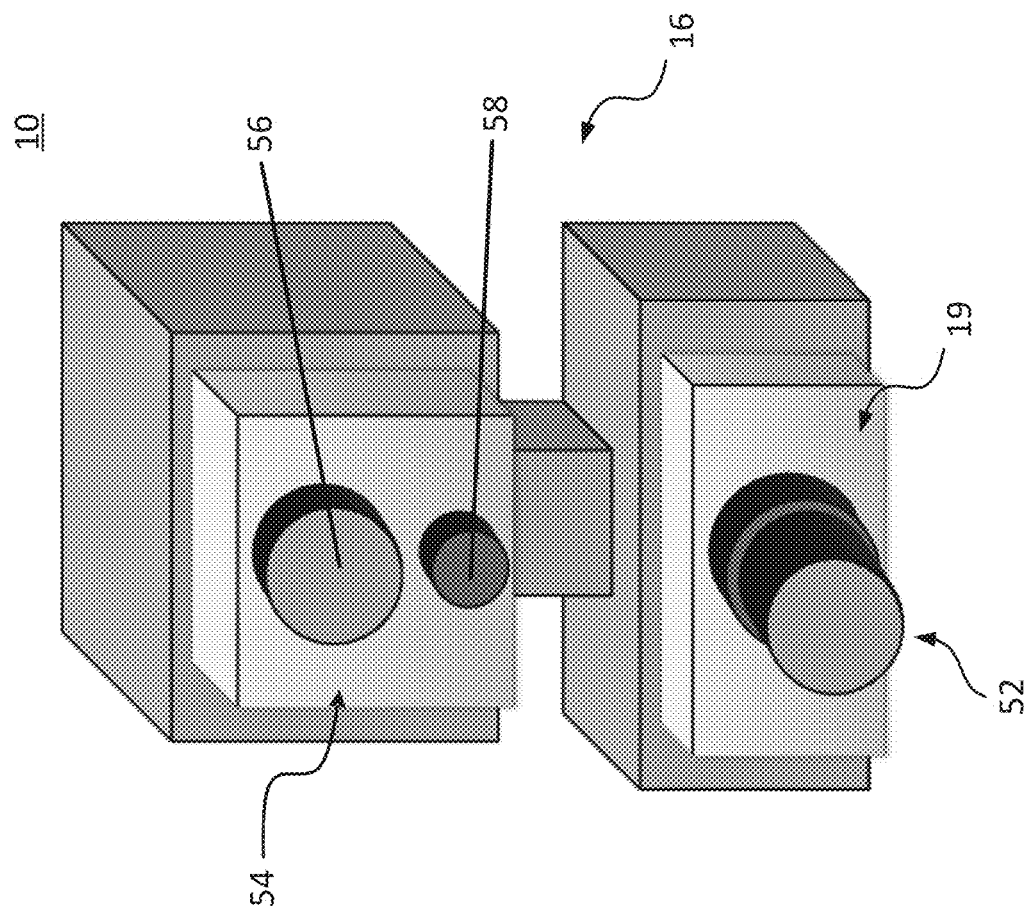
FIG. 4 shows an exemplary auxiliary focusing device configured in accordance with embodiments of the present disclosure.

Referring to the figures, sensory device 19 (FIG. 1) may include a main camera (such as imaging device 124 in FIG. 3) with an adjustable focus configured to capture one or more of images and videos. Sensing system 18 (FIG. 1), in the meantime, may include an auxiliary focusing module that facilitates the autofocusing of the camera in sensory device 19. FIG. 4 illustrates one such example, in which sensory device 19 may be provided as a main camera 52 with an adjustable focus, and sensing system 18 may include an auxiliary focusing device 54. Auxiliary focusing device 54 may include, for example, a vision sensor 56 (such as a camera) and a distance measurement unit 58. Distance measurement unit 58 may include a directional source that emits an infrared laser pulse, or any other laser pulse or beam at a desired frequency, towards an object, and receive light beams reflected off the object, and determine distance based on time-of-flight.

The auxiliary focusing device 54 may be embedded in or attached to camera 52. Alternatively, the auxiliary focusing device 54 may be a stand-alone device that coordinates with the imaging system for measuring a distance. In the example shown, main camera 52 and auxiliary focusing device 54 may be separately mounted on carrier 16 and movable object 10, respectively. In alternative embodiments, main camera 52 and auxiliary focusing device 54 may be mounted on the same carrier or structure, through supporting structures such as gimbals. The mounting of main camera 52 and auxiliary focusing device 54 may provide for relative change in position or orientation with respect to each other. Alternatively, main camera 52 and auxiliary focusing device 54 may be mounted on separate gimbals, which may or may not provide the same degree of freedom for their respective movements. Further vision sensor 56 and distance measurement unit 58 may be provided on the same mounting structure (such as a gimbal) or on separate mounting structures.

A remote control consistent with embodiments of the present disclosure may consist of, for example, remote control 32 described above in connection with FIGS. 2A and 2B. When a display is included in the remote control or a separate device (such as a computer or smartphone), such display may display images taken by the main camera or the vision sensor, transmitted wirelessly from the movable object to the remote control. When vision sensor 56 comprises a camera, either the main camera or the vision sensor may provide the first-person view (FPV) on the display for user's control of the movable object.

Consistent with embodiments of the present invention, auxiliary focusing device 54 may assist in determination of the focus of main camera 52. For example, distance measurement unit 58 may measure distance to an object, and main camera 52 may adjust its focus according to the measured distance. In some embodiments, vision sensor 56 may capture a view or image of the surrounding of movable object 10. The vision subsystem 104 of movable object 10 may detect an object within the view or image. Distance measurement unit 58 can then measure the distance to the detected object. Alternatively, the captured view or image may be transmitted to terminal 32 for display to the user or operator. The user may identify an object of interest through controls on terminal 32, which may transmit the user's identification to movable object 10. Distance measurement unit 58 can then measure the distance to the object identified by the user. In one aspect, execution of the determination of focus and the adjustment of focus by separate components (e.g. by the auxiliary focusing device and by main camera 52, respectively) may allow main camera 52 to adjust its focus to fall on objects outside the of camera's view, thereby providing greater flexibility than traditional autofocusing methods. Vision sensor 56 may further track the detected or identified object, such that distance measurement unit 58 continues to measure the distance to the object and the focus of main camera 52 remains on the object when the object moves in or out of the view of main camera 52. Depending on the applications, the detected or identified object may be anything of interest, for example a nonmoving object, such as a tree, or a moving object, such as a vehicle or a person or even a part of a person's face.

Figure 5:
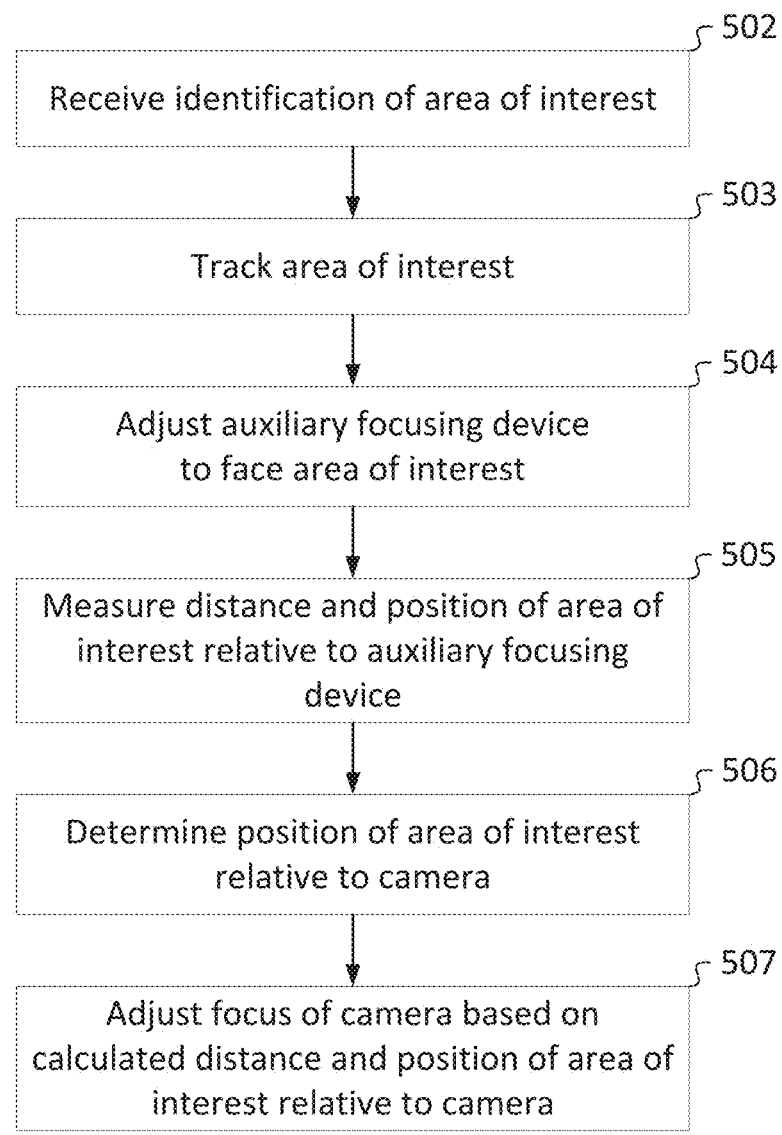
FIG. 5 shows a flow diagram of an exemplary autofocusing process in accordance with embodiments of the present disclosure.

Reference is now made to FIG. 5, which illustrates steps of an autofocusing process 500, consistent with embodiments of the present disclosure. For purposes of explanation and not limitation, process 500 may be performed by software executing in controller 300 and/or movable object 10.

In step 502, an area of interest may be identified. This area of interest may be an object, such as a tree, a landmark, a person, or the face of a person, in the view or image captured by the vision sensor in the auxiliary autofocusing device. Identification of the area of interest may be achieved through object detection or user designation on a display of the view or image on the remote terminal. The area of interest may also be identified through predetermination, for example, set by controller 300.

In step 503, the area of interest may be tracked. Tracking the area of interest may be achieved automatically by image processing to identify the movement of the area of interest in the view of vision sensor 56, or by the user viewing such movement and exercising corresponding controls on terminal 32.

In step 504, based on tracking of the measurement, auxiliary focusing device 54 may be adjusted to prepare for distance measurement. For example, if distance measurement unit 58 includes a directional source, such as a laser or ultrasound generator, the directional source may be first tuned or adjusted to face the area of interest, based on the position of the area of interest in the view of vision sensor 56. If distance measurement unit 58 is movable within auxiliary focusing device 54, then the adjustment of the directional source may be achieved through controlled movement of distance measurement unit 58. If distance measurement unit 58 is not movable but auxiliary focusing device 54 is movable within movable object 10, then the adjustment of the directional source may be achieved through controlled movement of auxiliary focusing device 54. If neither movement of distance measurement unit 58 within auxiliary focusing device 54 nor movement of auxiliary focusing device 54 within movable object 10 is permitted, the adjustment of the directional source may be achieved through controlled movement of movable object 10 by, for example, controlling propulsion devices 12 of movable object 10 to adjust the spatial disposition, velocity, and/or acceleration of the movable object 10 with respect to six degrees of freedom (e.g., three translational directions along its coordinate axes and three rotational directions about its coordinate axes) to enable movable object 10 to automatically track the target. If more than one of these components can move with respect to one another, then a combination of controlled movements thereof may be used to achieve the desired adjustment or tuning of the directional source.

Once the directional source is adjusted to face the area of interest, distance may be measured based on, for example, time of flight in step 505. In particular, the distance to the area of interest from the auxiliary focusing device 54/main camera 52 may be calculated based on a total time of the light beam traveling back and forth between the area of interest and the auxiliary focusing device, and the speed of the emitted wave such as light, infrared signal, or ultrasound.

Steps 504 and 505 may be repeated as needed. For example, after distance measurement in step 505, step 504 may be performed again to fine adjust auxiliary focusing device 54 to better orient it towards the area of interest, after which step 505 may be performed again to achieve better measurement accuracy, and so on.

In step 506, the distance and position of the area of interest relative to main camera 52 may be determined. In particular, as discussed in detail below, the position of the area of interest relative to auxiliary focusing device 54 and the position or posture of auxiliary focusing device 54 relative to main camera 52 may be used to make such determination. Such determination may be performed in controller 22 or may be distributed across multiple processors located within auxiliary focusing device, main camera 52, and/or other places of movable object 10.

In step 507, the focus of camera 52 may be adjusted based on the determined relative distance and position of the area of interest. In one aspect, camera 52 may include a mechanism for automatically adjusting its own focus. For example, camera 52 may include software control that adjusts the positions of the lenses based on the distance and position of the area of interest. In other aspects, controller 22 may control camera 52 to adjust the focus.

Figure 6A:
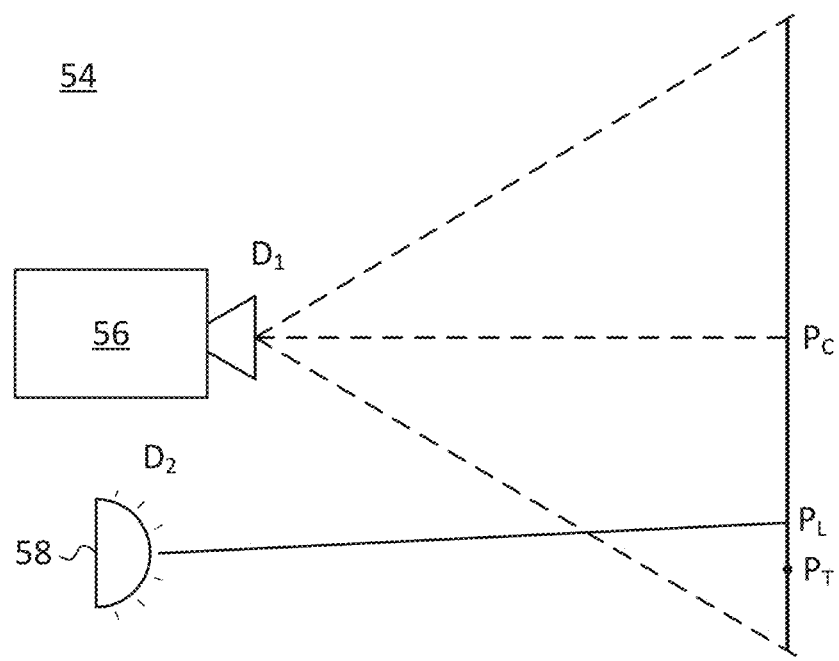
FIGS. 6A and 6B illustrates an exemplary focusing technique consistent with embodiments of the present disclosure.
Figure 6B:
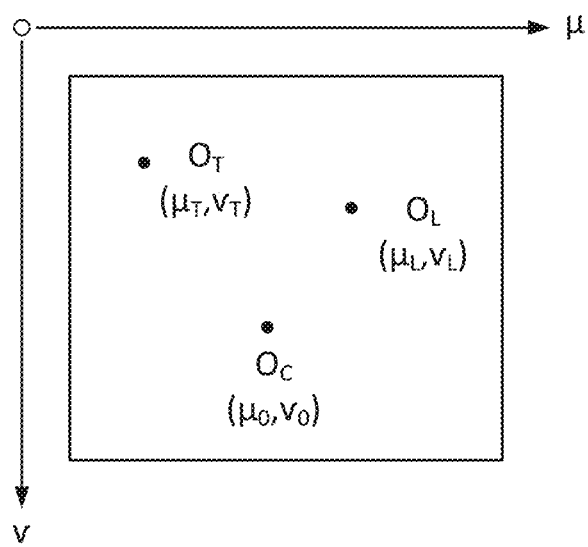

As an example, FIGS. 6A and 6B illustrate the determination of the relative distance and position between the area of interest, e.g., a target object $P_T$, and auxiliary focusing device 54. In the example shown, vision sensor 56 may include a camera positioned at point $D_1$, and distance measurement unit 58 may include a laser positioned at point $D_2$. Distance measurement unit 58 may project a laser point at $P_L$ on or near the target object $P_T$ and may measure the time of flight to and from $P_L$. FIG. 6B shows an exemplary view of the camera of vision sensor 56. Laser point $P_L$ corresponds to point $O_L$ in the camera's view, as detected by the sensors in the camera. The center of camera view (or the principal point) $O_C$ corresponds to a point $P_C$ in the plane of the object. The target object $P_T$ as identified by the user corresponds to point $O_T$ in the view.

As shown in FIGS. 6A and 6B, the camera in vision sensor 56 and distance measurement unit 58 may be displaced from each other and need not necessarily be parallel to each other; and the laser point $P_L$ does not coincide with the center of the view $P_C$ or the position of target object $P_T$. Thus, measurement of distance z may not accurately reflect the distance to target object $P_T$, in which case auxiliary focusing device 54 may need to adjust itself or distance measurement unit 58 to focus the laser on the target object to obtain more accurate measurement. Such adjustment needs to be based on the positional relationship of the camera and distance measurement unit 58.

In one aspect, the adjustment to focus the laser on the target object may be achieved through comparison of the relative positions of the laser point $P_L$, the center of view $P_C$ of the vision sensor, the target object $P_T$, and/or their corresponding positions, i.e., pixel coordinates, on the image captured by the camera's sensor. The pixel coordinates ($u_O$, $v_O$) of the principal point $O_C$ (corresponding to $P_C$) are known. The pixel coordinates ($u_T$, $v_T$) of the target object $P_T$ as projected on the sensor are also known, because the user identifies the target object on the sensor image.

The positional relationship between the laser and the vision sensor can be used to find the pixel coordinates ($u_L$, $v_L$) of the laser point $P_L$. As the laser point only measures a dimensionless distance z, $P_L$ may be initially represented in the laser's own framework as three-dimensional coordinates $P_L^L=(0,0,z)$. For ease of description, superscripts, such as the letter z in the top right corner of $P_L^z$, indicate the coordinate system or frame of reference in which the parameter is defined. When the superscript has two letters, the parameter describes the relationship between the two coordinate systems or frames of reference indicated by the individual letters. In the vision sensor's perspective, i.e., in a coordinate system defined with the vision sensor's position and orientation, the three-dimensional coordinates $P_L^V$ of the laser point $P_L$ may be represented as a transformation of $P_L^L$:

$$P_L^V = R^{VL} P_L^L + T^{VL} \quad (1)$$

wherein $R^{VL}$ is a matrix describing the rotational relationship from the laser's framework to the vision sensor's framework at distance z; and $T^{VL}$ is a matrix describing the translational relationship between the two frameworks, also at distance z.

$R^{VL}$ and $T^{VL}$ may be determined based on the relative positions of the laser and the camera of auxiliary focusing device 54, which are known to movable object 10. Because $R^{VL}$ and $T^{VL}$ describe the transformation between the laser and the camera at distance z, the two matrices necessarily depend on and vary with distance z.

When a camera (in the vision sensor) captures an image, a real point in space is projected as an imaginary point from the view point of the camera's sensor. The coordinates of the real point and the coordinates of the imagery point are related through an intrinsic matrix K of the camera:

$$K = \begin{bmatrix} \alpha_x & \gamma & u_o \\ 0 & \alpha_y & v_o \\ 0 & 0 & 1 \end{bmatrix} \quad (2)$$

where $a_x=fm_x$, $a_y=fm_y$, f is camera focal length, $m_x$ and $m_y$ are the scaling factors along the x and y axes, $\gamma$ is the skew parameter between x and y axes, and ($u_O$, $v_O$) are coordinates of the principal point $O_C$. Thus, the location $P^*_L$ of the imaginary point, as viewed from the camera's sensor through its lenses, can be expressed as:

$$P_L^* = \begin{bmatrix} x \\ y \\ z \end{bmatrix} = K P_L^V \quad (3)$$

On the image captured by the sensor inside the camera of the vision sensor, the corresponding point is $$O_L = \begin{bmatrix} u_L \\ v_L \\ 1 \end{bmatrix} = \begin{bmatrix} x/z \\ y/z \\ 1 \end{bmatrix} \quad (4)$$

Once the location of the laser point on the image is determined, the difference $\Delta$ between the laser point and the location of the target object can be determined:

$$\Delta = \begin{bmatrix} \Delta u \\ \Delta v \end{bmatrix} = \begin{bmatrix} u_T - u_L \\ v_T - v_L \end{bmatrix} \quad (5)$$

If, through tracking of the object or area of interest, the camera of auxiliary focusing device 54 adjusts its view so that the target object is at the center of the camera's view, then $O_T$ coincides with $O_C$, and $$\Delta = \begin{bmatrix} \Delta u \\ \Delta v \end{bmatrix} = \begin{bmatrix} u_0 - u_L \\ v_0 - v_L \end{bmatrix} \quad (6)$$

In some aspects, having the camera track the target object and adjust itself to keep the target object at its center may simplify the adjustment of the laser to be oriented towards, or focus on, the target object, especially where the laser initially projects in an area at a distance away from the target object.

The difference $\Delta$ between the laser point and the location of the target object can then be used to adjust the laser to focus on the object selected by the user, through rotation in both x and y directions:

$$\begin{bmatrix} \varphi_x \\ \varphi_y \end{bmatrix} = \begin{bmatrix} \frac{\Delta u}{w} \cdot FoV_x \\ \frac{\Delta v}{h} \cdot FoV_y \end{bmatrix} \quad (7)$$

where $\varphi_x$ and $\varphi_y$ are the angles of rotation in the x and y directions, w and h are the width and height of the image size sensed by the camera sensor, and $FoV_x$ and $FoV_y$ are the fields of view in the x and y directions. For example, if the diagonal field of view of the camera sensor is FoV, then $$FoV_x = 2\tan^{-1}\left(\tan\left(\frac{FoV}{2}\right) \cdot \frac{w}{\sqrt{w^2 + h^2}}\right) \quad (8\text{-}1)$$

$$FoV_y = 2\tan^{-1}\left(\tan\left(\frac{FoV}{2}\right) \cdot \frac{h}{\sqrt{w^2 + h^2}}\right) \quad (8\text{-}2)$$

As mentioned above, the transformation matrices, $R^{VL}$ and $T^{VL}$ depend on the distance z and the adjustment to focus the laser point on the area of interest may affect the measurement of distance z. Therefore, distance measurement unit 58 may perform another measurement after an adjustment to obtain a more accurate value of distance z. After the updated measurement, a further, finer adjustment may be made based on the methods described. This measurement-adjustment cycle may be repeated several times to achieve satisfactory accuracy.

Because moveable object 10 and its various components may be in motion collectively and/or with respect to one another, and the target object may be moving too, the distance measurement may be affected by disturbances or noise caused by such movements. Consistent with embodiments of the present disclosure, multiple distance measurements may be repeated over time and combined to obtain more precise determination of the distance. Examples of such processing (or data fusion) may be, for example, averaging, filtering, or else. Commonly known filters such as Kalman filter, Butterworth filter, or else, may be used.

As an example, a Kalman filter may be applied to the distance measurements to reduce the impact of noise. As is known in the art, Kalman filter is a recursive filter that provides a prediction of the state of variables based on observations. The state of a movable object, for example, can be defined with two observables, the object's position x (a three-dimensional vector) and velocity $\dot{x}$ (derivative of x over time). A state space X can be defined with the two observables combined:

$$X = \begin{bmatrix} x \\ \dot{x} \end{bmatrix} \quad (9)$$

The state space $X_k$ at time k can be predicted from the state space $X_{k-1}$ at time k−1 based on Newton's laws of motion:

$$X_k = FX_{k-1} + Ga_k \quad (10)$$

where $F = \begin{bmatrix} 1 & \Delta t \\ 0 & 1 \end{bmatrix}$ and $G = \begin{bmatrix} \Delta t^2/2 \\ \Delta t \end{bmatrix}$.

Here, $\alpha_k$ is the object's acceleration between time k−1 and time k that may have been caused by uncontrolled forces or disturbances, such as wind, slipping on slippery road, etc. As noise to the otherwise precise prediction based on Newton's laws of motion, $\alpha_k$ is assumed to have a normal (Gaussian) distribution with a mean value of 0 and a standard deviation of $\sigma_\alpha$, i.e., $$\alpha_k \sim N(0, \sigma_\alpha).$$

In addition to the noise during the prediction, when the state space X is observed or measured, more noise may be introduced, such that the measurement Z at time k is:

$$Z_k = HX_k + \varepsilon_k \quad (11)$$

where H is the measurement matrix that represents the relationship between the state space X and the variables or observables under measurement. $\varepsilon_k$ represents measurement noise, which is also assumed to have a normal distribution with a mean value of 0 and a standard deviation of $\sigma_k$, i.e., $\varepsilon_k \sim N(0, \sigma_k)$.

Based on measurement $Z_k$, a best estimate of $X_k$ may be made. The best estimate of $X_k$ is considered the value of the state space at time k and may also be used in conjunction with formula (10) to predict the state space at the next time k+1. The Kalman filter uses a covariance matrix P to reflect the accuracy of the prediction and best estimate of the state space. The covariance matrix at time k−1 is used in combination with other information, such as measurement $Z_k$ (calculated by formula (11)) and the prediction of $X_k$ (calculated by formula (10)), to find the best estimate of $X_k$. Like the state space, a prediction of the covariance matrix at time k, $P_{k|k-1}$, is made based on information available at time k−1, i.e., measurement $Z_{k-1}$, best estimate of $X_{k-1}$, the covariance matrix at time k−1, and the assumed noise levels. After measurement at time k, the covariance matrix is updated to $P_{k|k}$, which may then be used in determination of the best estimate of $X_k$ and prediction of the covariance matrix for next time k+1, $P_{k+1|k}$.

Thus, with more observations over time, the state space and covariance matrix are constantly updated, self-correcting possible accumulation of errors. Noises are evened out rather than accumulated. The prediction of the state space, as well as the best estimate of the current state space based on the prediction and measurement, become more accurate.

Consistent with embodiments of the present disclosure, a Kalman filter may be used to estimate the location of the target object with relative precision. As in the example discussed above, equations (9) and (10) can be applied, as the motions of the movable object and the target object follow Newton's laws of motion. To find out the distance of the target object from the main camera, two variables may be measured or observed, such as the pixel coordinates ($u_T$, $v_T$) of the target object on the image of the sensor, as well as the location $P_T^C$ of the target object with in the frame of reference of the camera of the auxiliary focusing device:

$$\begin{bmatrix} u_T \\ v_T \\ 1 \end{bmatrix} = K[R^{VW}(P_T^W - P_V^W)] + \delta_k = K[R^{VI}R^{IW}(P_T^W - (P_I^W + R^{WI}T_V^I))] + \delta_k \quad (12\text{-}1)$$

$$P_T^V = R^{VW}(P_T^W - P_V^W) + \gamma_k = R^{VI}R^{IW}(P_T^W - (P_I^W + R^{WI}T_V^I)) + \gamma_k \quad (12\text{-}2)$$

In formulas (12-1) and (12-2):
- $R^{VW}$ is the matrix describing the rotational relationship from the world coordinate system to the vision sensor's frame of reference;
- $P_T^W$ is the location of the target object in the world coordinate system;
- $P_V^W$ is the location of the vision sensor in the world coordinate system;
- $\delta_k$ is the noise, at time k, in the observation of the pixel coordinates;
- $R^{VI}$ is the matrix describing the rotational relationship from the inertial measurement unit (IMU)'s frame of reference to the vision sensor's frame of reference;
- $R^{IW}$ is the matrix describing the rotational relationship from the world coordinate system to the IMU's frame of reference;
- $P_I^W$ is the location of the IMU in the world coordinate system;
- $R^{WI}$ is the matrix describing the rotational relationship from the IMU's frame of reference to the world coordinate system;
- $T_V^I$ is the location of the vision sensor in the IMU's frame of reference ($T_V^I$ may be the same as $T^{VI}$, the translational matrix between the IMU's frame of reference and the vision sensor's frame of reference);
- $P_T^V$ is the location of the target object in the vision sensor's frame of reference; and
- $\gamma_k$ is the noise, at time k, in the observation of the three-dimensional location of the target object in the vision sensor's frame of reference.

The noise in the observations or measurements follow a normal (or Gaussian) distribution, i.e., $\delta_k \sim N(0, \sigma)$, and $\gamma_k \sim N(0, \sigma_k)$, where $\sigma$ and $\sigma_k$ are the standard deviations in the observations of the pixel coordinates and 3-D location of the target object, respectively, and $\sigma^2$ and $\sigma_k^2$ represent the corresponding variances.

Initial states of the Kalman filter can be configured through several initial measurements, for example, $$X_0 = \begin{bmatrix} x_0 \\ 0 \end{bmatrix},$$

where $x_0$ is the average of several measurements of the position of the object at time 0. The covariance matrix may be initialized to be $$P_{0|0} = \begin{bmatrix} B & 0 \\ 0 & B \end{bmatrix} \quad (13)$$

The value of B may be chosen based on application needs. A greater value of B gives the earlier measurements more weight, whereas a smaller value of B weighs later measurements more.

With filtering, the location of the target object $P_T^V$ in the camera's frame of reference can be reliably determined. The location of the target object $P_T^M$ in the main camera's frame of reference can then be determined:

$$P_T^M = R^{MV} P_T^V + T^{MV} \quad (14)$$

wherein $R^{MV}$ is the matrix representing the rotational relationship from the vision sensor to the main camera 52, and $T^{MV}$ is the matrix describing the translational relationship from the vision sensor to the main camera 52.

Once the location of the target object in the main camera's frame of reference is determined, the desired depth d of focus can be determined. Consistent with embodiments of the present disclosure, the main camera can focus on the target object. Alternatively, the main camera can focus at the desired depth d regardless of whether the target object is in view of not. For example, the depth d can be determined from the three-dimensional location $P_T^M$ of the target object as:

$$d = |P_T^M| \quad (15\text{-}1)$$

or $$d = (P_T^M)^{(3)} \quad (15\text{-}2)$$

where $|P_T^M|$ is the length of the vector represented by $P_T^M$. $(P_T^M)^{(3)}$ indicates the third component of $P_T^M$, i.e., the z component.

Figure 7:
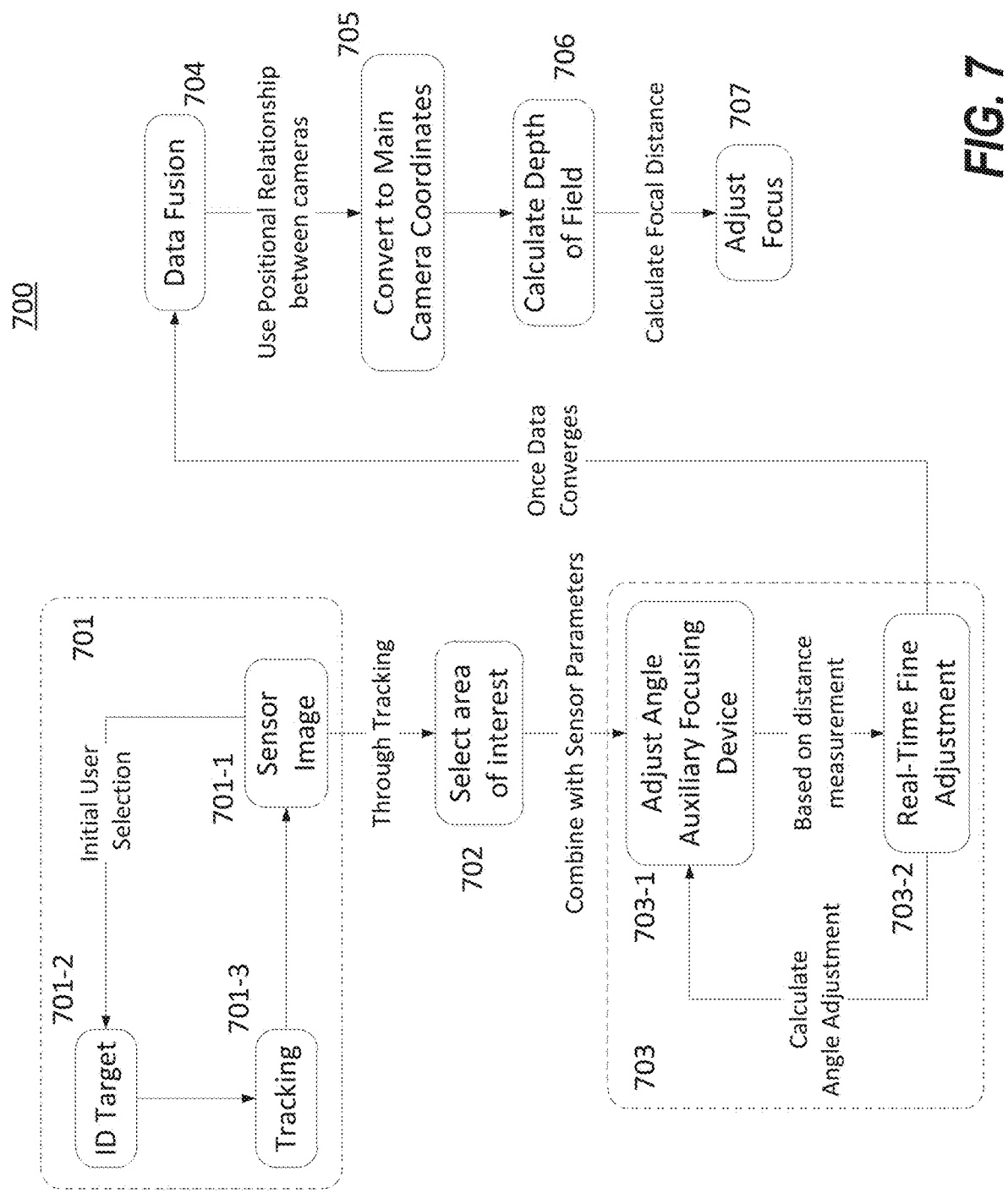
FIG. 7 shows a flow diagram of another exemplary autofocusing process in accordance with embodiments of the present disclosure.

FIG. 7 illustrates another exemplary autofocusing process 700, consistent with embodiments of the present disclosure. For purposes of explanation and not limitation, process 700 may be performed by software executing in controller 300 and/or movable object 10.

In step 701, an area of interest may be identified. This area of interest may be an object, such as a tree, a landmark, a person, or the face of a person, in the view or image captured by the vision sensor in the auxiliary autofocusing device. Identification of the area of interest may be achieved through object detection or user designation on a display of the view or image on the remote terminal, at step 701-1. Once the user selects the area of interest, controller 300 or movable object 10 recognizes the identified target area at step 701-2 and activates tracking algorithm to keep track of the target at 701-3.

The same target or area of interest will remain selected or tracked, at step 702, through tracking algorithm.

In step 703, the auxiliary focusing device is adjusted to prepare for distance measurement. For example, if distance measurement unit 58 includes a directional source, such as a laser or ultrasound generator, the directional source may be first tuned or adjusted to face the area of interest, at step 703-1, based on the position of the area of interest in the sensor image or in the view of vision sensor 56. This adjustment takes into calculation or account the sensor parameters of the auxiliary focusing device and/or posture of the main camera.

The adjustment of the auxiliary focusing device may be fine-tuned, at step 703-2, after a distance measurement by the distance measurement unit. And the fine tuning may be repeated until data converges, after which data fusion may be performed, at step 704, to reduce the impact of disturbances or noise.

Once the distance from the auxiliary focusing device to the target object or area is measured, parameters of the target object or area is converted into the coordinate system of the main camera, at step 705, based on the positional relationship between the main camera and the auxiliary focusing device. At step 706, the depth of field (DOF) of the target object or area is calculated in the coordinate system of the main camera.

Based on the calculated depth of field, the focal distance may be determined and then, at step 707, the focus of the main camera may be adjusted.

It is to be understood that the disclosed embodiments are not necessarily limited in their application to the details of construction and the arrangement of the components set forth in the following description and/or illustrated in the drawings and/or the examples. The disclosed embodiments are capable of variations, or of being practiced or carried out in various ways.

It will be apparent to those skilled in the art that various modifications and variations can be made to the disclosed devices and systems. Other embodiments will be apparent to those skilled in the art from consideration of the specification and practice of the disclosed devices and systems. It is intended that the specification and examples be considered as exemplary only, with a true scope being indicated by the following claims and their equivalents.

What is claimed is:

1. An apparatus operably coupled to a first camera for focusing the first camera, comprising:
    a vision sensor configured to capture a view, the vision sensor comprising a second camera;
    a processor configured to receive a selection of an area of interest in the view captured by the vision sensor; and
    a distance measurement unit coupled to the processor and configured to be oriented towards the area of interest based on a position of the area of interest in the view captured by the vision sensor, and to measure a distance to the area of interest for adjusting the first camera's focus.

2. The apparatus of claim 1, wherein the apparatus is movable with respect to the first camera.

3. The apparatus of claim 1, wherein the distance measurement unit is movable with respect to the first camera.

4. The apparatus of claim 1, wherein the apparatus is mounted on a same object as the first camera.

5. The apparatus of claim 1, wherein the vision sensor, the distance measurement unit, and the first camera are all movable with respect to one another.

6. The apparatus of claim 1, wherein the apparatus is mounted on an unmanned aerial vehicle (UAV).

7. The apparatus of claim 1, wherein the distance measurement unit measures the distance based on a time of flight.

8. The apparatus of claim 7, wherein the distance measurement unit uses laser to measure the distance.

9. The apparatus of claim 7, wherein the distance measurement unit uses an ultrasound wave to measure the distance.

10. The apparatus of claim 1, wherein the processor receives the selection of the area of interest from a user.

11. The apparatus of claim 1, wherein the distance measurement unit measures the distance more than once.

12. The apparatus of claim 11, wherein the processor is configured to process one or more distance measurements by the distance measurement unit to reduce an impact of noise.

13. The apparatus of claim 12, wherein the processor uses a Kalman filter to process the one or more distance measurements.

14. The apparatus of claim 1, wherein the processor is configured to cause adjustment of the apparatus based on the measured distance.

15. The apparatus of claim 14, wherein the processor is configured to cause the adjustment of the apparatus for the distance measurement unit to be oriented towards the area of interest.

16. The apparatus of claim 15, wherein the processor is configured to cause the distance measurement unit to repeat the distance measurement after the adjustment of the apparatus.

17. The apparatus of claim 1, wherein the vision sensor is configured to track the area of interest.

18. The apparatus of claim 17, wherein the vision sensor tracks the area of interest such that the area of interest remains at the center of the view.

19. The apparatus of claim 1, wherein the processor is configured to cause the first camera to focus based on the measured distance, regardless of whether the area of interest is in a view of the first camera.

* * * * *